(12) United States Patent
Holcomb

(10) Patent No.: US 7,692,001 B2
(45) Date of Patent: Apr. 6, 2010

(54) CATALYST AND METHOD FOR PRODUCTION OF POLYOLS BY HYDROGENOLYSIS OF CARBOHYDRATES

(75) Inventor: Dale E. Holcomb, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 123 days.

(21) Appl. No.: 11/845,155

(22) Filed: Aug. 27, 2007

(65) Prior Publication Data

US 2007/0293665 A1     Dec. 20, 2007

Related U.S. Application Data

(63) Continuation-in-part of application No. 11/296,913, filed on Dec. 8, 2005.

(51) Int. Cl.
    *C07H 1/00*     (2006.01)
    *C07H 3/00*     (2006.01)
    *C08B 37/00*     (2006.01)

(52) U.S. Cl. .................................................. 536/124

(58) Field of Classification Search .................. 536/124
    See application file for complete search history.

(56) References Cited

U.S. PATENT DOCUMENTS 3,871,445 A     3/1975    Wanka et al.
4,380,678 A *    4/1983    Sirkar ........................ 568/863
4,516,632 A     5/1985    Swift et al.
5,162,517 A    11/1992    Darsow
5,814,112 A *    9/1998    Elliott et al. ............... 48/197 R
6,177,598 B1 *    1/2001    Brunner et al. ............. 568/863
6,488,742 B1    12/2002    Gunewald et al.
6,900,361 B2 *    5/2005    Elliott ........................ 568/863

FOREIGN PATENT DOCUMENTS

GB     2184367 A *    6/1987

OTHER PUBLICATIONS

U.S. Appl. No. 10/420,047, filed Apr. 21, 2004, Suppes, G., et al.
U.S. Appl. No. 11/088,603, filed Nov. 3, 2005, Suppes, G., et al.
U.S. Appl. No. 11/510,992, filed Aug. 28, 2006, Suppes, G., et al.

* cited by examiner

*Primary Examiner*—Melvin C Mayes
*Assistant Examiner*—Michael Forrest

(57) ABSTRACT

A catalyst and method for the hydrogenolysis of carbohydrates is disclosed. The catalyst comprises nickel metal on an alumina-silica support. Optionally, the catalyst may be promoted with noble metals selected from the group consisting of copper, ruthenium, rhodium, palladium, platinum, gold, silver, and combinations thereof. The method involves reacting hydrogen gas with a carbohydrate in a polar solvent in the presence of a fixed bed of catalyst.

13 Claims, No Drawings

US 7,692,001 B2

CATALYST AND METHOD FOR PRODUCTION OF POLYOLS BY HYDROGENOLYSIS OF CARBOHYDRATES

CROSS REFERENCE TO RELATED APPLICATIONS

This application is a continuation-in-part of application Ser. No. 11/296,913, filed Dec. 8, 2005 which is incorporated herein in its entirety by reference.

BACKGROUND

The present development is a catalyst and method useful for the production of polyols. Specifically, the invention is directed to the use of a nickel on alumina-silica catalyst for the hydrogenolysis of carbohydrates. Optionally, the catalyst may be promoted with noble metals. The method comprises reacting a carbohydrate with hydrogen in an aqueous media in the presence of the nickel on alumina-silica catalyst Polyols are commonly derived from sugars or carbohydrates. An aqueous solution of sugar is treated with hydrogen in the presence of a nickel catalyst to produce a sugar alcohol. The sugar alcohol, when further treated with hydrogen in the presence of the nickel catalyst, can be converted to polyols and glycols.

Because the media for these hydrogenation reactions is water, it can be challenging to identify an effective, relatively long-lived catalyst for these processes. One approach identified in the prior art was to use colloidal metal. This avoided the problem that many common catalyst supports are not stable in water. However, it was difficult and expensive to remove the colloidal metal from the resulting polyols and glycols. In U.S. Pat. No. 5,162,517 (issued to Darsow on Nov. 10, 1992), carrier-free catalysts are processed into mouldings from metal powders. The metal powders include elements of the iron group, such as nickel, cobalt, iron and mixtures and alloys of these metals. The mouldings comprise at least 70% metal.

Supported metal catalysts have also been proposed for use in carbohydrate hydrogenation processes. Silica-alumina carriers are known in the art, but the '517 patent found these to be problematic: "nickel catalysts on a carrier ($SiO_2/Al_2O_3$) [have] extremely high active surfaces of 140-180 $m^2/g$ so that the catalysts are so active that they must be stabilized by additional chemical treatment methods . . . . However, the deactivating stabilization of the catalyst then requires such high reaction temperatures during the hydrogenation of sugars (130-180° C.) that uncontrollable side reactions can occur . . . . " In U.S. Pat. No. 4,380,678 (issued to Sirkar on Apr. 19, 1983), a nickel on silica-alumina catalyst is used in a process for the catalytic conversion of monosaccharides to polyols. However, the process is a multi-stage process and has a relatively low conversion rate. In the process of the '678 patent a monosaccharide feedstream is initially reacted with hydrogen at a temperature of from 130° C. to 180° C., and then the product of this first-stage reaction zone is moved to a second-stage reaction zone where the product is combined with a promoter material and hydrogen and reacted in the presence of a catalyst at a temperature of from 430° C. to 490° C.

Raney catalysts are also known in the art of carbohydrate conversion. For example, U.S. Pat. No. 6,414,201 (issued to Shimazu et al. on Jul. 2, 2002), teaches and claims a process that uses a Raney catalyst formed by melting a mixture of nickel and aluminum and then quenching droplets of the mixture to form a lump alloy, from which particles are broken. However, it is generally known in the art that Raney catalysts work well in static operations, but are not well-adapted to function effectively in continuous processes. Further, similar to the processes using colloid metal, Raney catalysts must be separated and recovered from the reaction mixture at the end of the process.

SUMMARY OF THE INVENTION

The present development is a catalyst and method for the hydrogenolysis of carbohydrates. The catalyst comprises nickel metal on an alumina-silica support and the method comprises reacting a carbohydrate with hydrogen in the presence of the nickel on alumina-silica catalyst. Optionally, the catalyst may be promoted with noble metals. In particular, the catalyst of the present invention comprises from about 45 wt % to about 55 wt % nickel, from about 40 wt % to about 50 wt % alumina, and from about 1 wt % to about 10 wt % silica. The catalyst may further comprise up to about 0.5 wt % promoter.

The catalyst is intended to be used in an aqueous medium process for converting carbohydrates to polyols and/or glycols. In an exemplary embodiment, the method of the present invention comprises preparing a fixed bed of the catalyst in a reactor, then continuously feeding an aqueous solution of carbohydrate through the catalyst bed at a predetermined feed rate and while maintaining the catalyst bed at a temperature of from about 180° C. to about 250° C. and while maintaining a partial pressure of hydrogen at 1800-2400 psig. In a preferred embodiment, the carbohydrate is glycerin and the products of the reaction are propylene glycol and ethylene glycol. Further, the catalyst is intended to be used as a fixed bed of catalyst in a continuous process for converting carbohydrates to polyols and/or glycols.

DETAILED DESCRIPTION OF THE PREFERRED EMBODIMENT

The present development is a catalyst for use in processes for converting carbohydrates to polyols and glycols, and method for use of the catalyst. The carbohydrates are treated with hydrogen in an aqueous medium and in the presence of a hydrogenation catalyst comprising nickel metal on an alumina and silica support. Optionally, the catalyst may be promoted with a noble metal.

The catalyst of the present invention consists essentially of essentially of nickel metal, a metal promoter selected from the group consisting of copper, ruthenium, rhodium, palladium, platinum, gold, silver and combinations thereof, alumina and silica The nickel metal comprises from about 45 wt % to about 55 wt % of the total catalyst weight. The alumina to silica ratio (Al:Si) preferably ranges from about 4:1 to about 50:1, with the alumina comprising from about 40 wt % to about 50 wt % of the total catalyst weight, and the silica comprising from about 1 wt % to about 10 wt % of the total catalyst weight. In an exemplary embodiment of the catalyst, the nickel comprises from about 48 wt % to about 53 wt % of the total catalyst weight, the alumina comprises from about 43 wt % to about 46 wt % of the total catalyst weight, and the silica comprises from about 1 wt % to about 10 wt % of the total catalyst weight. The promoter may be present at up to about 0.5 wt % of the total catalyst weight.

The pore volume of the catalyst is preferably at least about 0.33 $cm^3/g$, and the specific surface area, measured by the BET procedure, is preferably at least 150 $m^2/g$. In an exemplary embodiment, greater than about 45% of the volume of the catalyst has a pore size of less than about 100 Å and greater than about 40% of the volume of the catalyst has a pore size of from about 100 Å to about 300 Å.

The nickel is introduced to the catalyst in the form of nickel nitrate. In an exemplary embodiment, the nickel nitrate is in the form of a solution containing about 13.8 wt % nickel. The alumina is introduced to the catalyst in the form of aluminum nitrate. In an exemplary embodiment, the aluminum nitrate is in the form of a solution containing about 60 wt % solids. The silica is introduced to the catalyst typically as a silica-containing binder in a variety of forms that are known in the art, such as precipitated silica, high surface area silica, bentonite, montmorillonite, and attapulgite.

In an exemplary process, the catalyst is prepared by a coprecipitation method. The nickel nitrate and aluminum nitrate are added together to form a pre-mix. Soda ash is then added to the pre-mix, and the mixture is allowed to precipitate and age for a period of time. The resulting precipitate is thoroughly washed, dried, and then calcined to an oxide lump. The lump is further ground and mixed with a silica-containing binder. The resulting ground lump is formed into the desired extrusions or tablets. The resulting catalyst comprises about 50.6 wt % Ni, 44.2 wt % $Al_2O_3$, and 5.2 wt % $SiO_2$, and has a pore volume of 0.44 $cm^3/g$, a BET specific surface area of 161 $m^2/g$, and a loss of ignition at 540° C. of less than about 5%.

Optionally, the catalyst may comprise up to about 0.5 wt % of a metal promoter, such as copper, ruthenium, rhodium, palladium, platinum, gold, silver. The promoter is may be added during precipitation or may be added into the premix— methods that are known in the art.

The method of the present invention comprises preparing a fixed bed of the nickel catalyst in a reactor, and heating the catalyst bed to a temperature of from about 180° C. to about 300° C. Hydrogen gas is introduced to the reactor until the reactor has a pressure of from about 1000 psig to about 3000 psig. A liquid feedstream comprising from about 15 wt % to about 50 wt % carbohydrate in water is then fed into the reactor at a liquid hourly space velocity (LHSV) of from about 0.2 to about 6.0.

The feedstream for the method of the present invention may comprise a carbohydrate dissolved in a liquid. The carbohydrate may be selected from the group consisting of a sugar, a sugar alcohol, sorbitol, glycerin, glycols, triols, polyglycols, and a combination thereof, wherein the sugar may be selected from carbohydrates with six carbon chains, such as, without limitation, glucose, galactose, maltose, lactose, sucrose, allose, altrose, mannose, gulose, idose, talose, or carbohydrates with five-carbon chains, such as, without limitation, ribose, arabinose, xylose, lyxose.

The carbohydrate is combined with a polar liquid, such as, without limitation, water, methanol, ethanol, ethylene glycol, propylene glycol, n-propanol, i-propanol and combinations thereof, to form a carbohydrate solution. Preferably, the carbohydrate comprises from about 15 wt % to about 50 wt % of the carbohydrate solution, and more preferably from about 20 wt % to about 35 wt %.

In an exemplary embodiment, without limitation, the catalyst bed is heated to a temperature of from about 180° C. to about 250° C., the hydrogen gas is introduced to the reactor until the reactor has a pressure of from about 1800 psig to about 2400 psig, the liquid feedstream comprises from about 20 wt % to about 35 wt % glycerin in water which is fed into the reactor at an LHSV of from about 0.5 to about 6.0. The reaction pH is controlled by addition of base as necessary to maintain the pH between 9.0 and 12.0, and preferably at about 11.0.

The following examples illustrate and explain the present invention, but are not to be taken as limiting the present invention in any regard.

Examples 1-12

Catalysts are prepared according to the compositions shown in Table 1.

TABLE 1

| | Example | | | | | |
|---|---|---|---|---|---|---|
| | 1 | 2 | 3 | 4 | 5 | 6 |
| Wt % Ni | 50.6 | 45.2 | 54.9 | 48 | 51.3 | 46.7 |
| Wt % $Al_2O_3$ | 44.2 | 44.3 | 40.4 | 47.6 | 43.1 | 46.2 |
| Wt % $SiO_2$ | 5.2 | 10.1 | 4.45 | 4.1 | 5.5 | 6.6 |
| Promoter | none | platinum | platinum | copper | ruthenium | silver |
| Wt % Promoter | zero | 0.4 | 0.25 | 0.3 | 0.1 | 0.5 |
| Al:Si | 8.5 | 4.4 | 9.1 | 11.6 | 7.8 | 7.0 |
| Pore Vol ($cm^3/g$) | 0.44 | 0.52 | 0.37 | 0.48 | 0.63 | 0.33 |
| Sur Area ($m^2/g$) | 161 | 169 | 181 | 153 | 168 | 156 |

| | Example | | | | | |
|---|---|---|---|---|---|---|
| | 7 | 8 | 9 | 10 | 11 | 12 |
| Wt % Ni | 47.3 | 50.6 | 51.7 | 49.2 | 53.5 | 50.6 |
| Wt % $Al_2O_3$ | 50 | 44 | 47.1 | 45.3 | 43.7 | 45.8 |
| Wt % $SiO_2$ | 2.35 | 5.25 | 0.95 | 5.2 | 2.7 | 3.4 |
| Promoter | ruthenium | silver | rhodium | palladium | copper | copper |
| Wt % Promoter | 0.35 | 0.15 | 0.25 | 0.3 | 0.1 | 0.2 |
| Al:Si | 21.3 | 8.4 | 49.6 | 8.7 | 16.2 | 13.5 |
| Pore Vol ($cm^3/g$) | 0.37 | 0.44 | 0.38 | 0.57 | 0.51 | 0.33 |
| Sur Area ($m^2/g$) | 164 | 155 | 148 | 174 | 161 | 163 |

Examples 13-18

Catalysts are tested by packing a fixed bed of catalyst into a reactor. The catalyst bed is then heated to predetermined temperature of from about 180° C. to about 300° C. Hydrogen gas is introduced to the reactor until the reactor has a pressure of from about 1000 psig to about 3000 psig. A liquid feedstream is fed into the reactor, and the exit gas is collected and analyzed. Reaction conditions and exit gas compositions are provided in Table 2.

TABLE 2

| | Example | | | | | |
|---|---|---|---|---|---|---|
| | 13 | 14 | 15 | 16 | 17 | 18 |
| Catalyst from | Ex. 1 | Ex. 1 | Ex. 1 | Ex. 1 | Ex. 1 | Ex. 1 |
| Bed Temp (° C.) | 180 | 200 | 220 | 240 | 270 | 300 |
| Pressure (psig) | 2400 | 2400 | 1800 | 2100 | 3000 | 1500 |
| Feed | 30% glycerin in water | 30% glycerin in water | 30% glycerin in water | 30% glycerin in water | 30% glycerin in water | 30% glycerin in water |
| Feed rate (LHSV) | 1.6 | 1.6 | 1.6 | 1.6 | 1.6 | 1.6 |
| Exit Gas Composition (wt %) | | | | | | |

TABLE 2-continued

| | Example | | | | | |
|---|---|---|---|---|---|---|
| | 13 | 14 | 15 | 16 | 17 | 18 |
| polyethylene glycol | 63 | 67 | 64 | 77 | 72 | 69 |
| ethanol | 63 | 67 | 64 | 77 | 72 | 69 |
| ethylene glycol | 14 | 16 | 16 | 12 | 11 | 12 |
| mixed butanediols | 4 | 3 | 5 | 4 | 3 | 6 |
| mixed hydrocarbons | 8 | 11 | 7 | 3 | 3 | 4 |

The catalyst and method of the present invention is intended for use in the hydrogenolysis of carbohydrates in aqueous media. The catalyst differs from the catalysts of the prior art by requiring that nickel metal be supported on a predominantly alumina-based support. It is understood that the composition of the catalyst and the specific processing conditions may be varied without exceeding the scope of this development.

What is claimed is:

1. A process for the continuous hydrogenolysis of a carbohydrate to produce polyols and glycols comprising the steps of:
   a) Providing a single reactor;
   b) Providing a water-stable catalyst in the single reactor, wherein the water-stable catalyst consists essentially of about 45 wt % to about 55 wt % nickel, up to about 0.5 wt % of a metal promoter, about 40 wt % to about 50 wt % alumina, and about 1 wt % to about 10 wt % silica binder, wherein the weight percentages are based on the total weight of the water-stable catalyst, and the water-stable catalyst is made by first co-precipitating and calcining the nickel, alumina and optionally the metal promoter to form a nickel, alumina and optional metal promoter precursor and then mixing the silica binder with the nickel, alumina and optional metal promoter precursor to form the water-stable catalyst;
   c) Heating the water-stable catalyst to about 180° C. to about 300° C.;
   d) Providing and maintaining a hydrogen gas to the reactor to achieve a pressure of about 1000 psig to about 3000 psig; and
   e) Continuously passing a liquid feed stream, containing about 15 wt % to about 50 wt % of a carbohydrate dissolved in a polar liquid through the reactor in the presence of the hydrogen and the water-stable catalyst.

2. The process of claim 1 wherein the carbohydrate is selected from the group consisting of a sugar, a sugar alcohol, sorbitol, glycerin, glycols, triols, polyglycols, carbohydrates with six-carbon chains, glucose, galactose, maltose, lactose, sucrose, allose, altrose, mannose, gulose, idose, talose, carbohydrates with five-carbon chains, ribose, arabinose, xylose, lyxose and combinations thereof.

3. The process of claim 1 wherein the carbohydrate is dissolved in the polar liquid at a concentration of about 20 wt % to about 35 wt %.

4. The process of claim 1 wherein the carbohydrate is glycerin and the polar liquid is water.

5. The process of claim 1 wherein the water-stable catalyst is heated to a temperature of about 180° C. to about 260° C.

6. The process of claim 1 wherein the hydrogen is provided and maintained at a pressure of about 1800 psig to about 2400 psig.

7. The process of claim 1 wherein the carbohydrate is passed through the reactor at a liquid hourly space velocity of about 0.2 to about 6.0.

8. The process of claim 1 wherein the carbohydrate is passed through the reactor at a liquid hourly space velocity of about 0.5 to about 2.0.

9. The process of claim 1 wherein the catalyst consists essentially of about 48 wt % to about 53 wt % nickel, about 43 wt % to about 46 wt % alumina, and about 1 wt % to about 10 wt % silica binder.

10. The process of claim 1 wherein the catalyst has a pore volume of at least about 0.33 cm$^3$/g.

11. The process of claim 1 wherein the catalyst has a specific surface area, measured by the BET procedure, of at least 150 m$^2$/g.

12. The process of claim 1 wherein the catalyst has an alumina to silica ratio of about 4:1 to about 50:1.

13. The process of claim 1 wherein the catalyst includes a promoter selected from the group consisting of copper, rhodium, palladium, platinum, gold, silver and combinations thereof.

* * * * *